United States Patent
Armstrong et al.

[11] 3,864,020
[45] Feb. 4, 1975

[54] LIGHT CONTROLLED LIGHT MODULATOR

[75] Inventors: John A. Armstrong, South Salem; Daniel R. Grischowsky, Peekskill, both of N.Y.

[73] Assignee: International Business Machines Corporation, Armonk, N.Y.

[22] Filed: Dec. 28, 1973

[21] Appl. No.: 429,337

[52] U.S. Cl............... 350/147, 350/157, 350/160 R
[51] Int. Cl............................................... G02f 1/16
[58] Field of Search........ 350/147, 151, 157, 160 R; 250/199

[56] References Cited
UNITED STATES PATENTS
3,671,747  6/1972  Duguay........................... 350/157 X

*Primary Examiner*—John K. Corbin
*Attorney, Agent, or Firm*—Sughrue, Rothwell, Mion, Zinn & Macpeak

[57] ABSTRACT

A light controlled light modulator is disclosed wherein a low intensity, circularly polarized driving light beam can be used to modulate or switch a linearly polarized main light beam. The main beam can be as much as three orders of magnitude more powerful than the driving beam, yet the response time is measured in picoseconds. The modulator itself comprises a coherent rotator and a polarizer, and modulation is accomplished by rotating the plane of polarization of the main beam under the control of the driving beam. The coherent rotator is a completely passive device and is a light cell containing an alkali metallic vapor such as rubidium or potassium.

9 Claims, 5 Drawing Figures

LIGHT CONTROLLED LIGHT MODULATOR

BACKGROUND OF THE INVENTION

1. Field of the Invention

The present invention generally relates to modulators for lasers and the like, and, more particularly, to an extremely fast, low loss, completely passive light modulator in which one light beam controls the passage of a second light beam.

2. Description of the Prior Art and

Light modulators are known in which the modulation is effected by the use of the electro-optical effect. Typically, an optical element consisting of an electro-optical material such as potassium dihydrogen phosphate (KDP) is used. In such materials, the index of refraction is changed by the application of an electric field. The modulating electric field may be supplied by a microwave energy source, for example. Light passing through the light cell undergoes a change of velocity as a result of variations in the refractive index which produces a phase modulation in accordance with the radio-frequency input signal.

It is also known that some optically active substances rotate the polarization plane of polarized light passed through them. Other substances devoid of this property acquire it when subjected to a strong magnetic field. This is known as the Faraday effect and is the principle of operation of some light modulators.

Common to light modulators based on either the electro-optical effect or the Faraday effect is the requirement for modulation sources of substantially high power. Furthermore, construction of these modulators is sometimes complicated owing to the need to couple electromagnetic energy into the electro-optical material or place the optical substance in a strong magnetic field.

Many investigators have long been aware of the method of optical pumping for producing non-equilibrium population distributions of atoms in their ground and excited states. Zeeman pumping is one optical pumping procedure which is relevant to this disclosure and is described in "Progress in Optics," edited by E. Wolf, Vol. V, pp. 5–8, published in 1966 by North-Holland Publishing Company, Amsterdam, Holland. This method produces unequal populations in the different magnetic sublevels of the ground and excited states of atoms. This type of pumping is possible because of the existence of quantum mechanical selection rules concerning the absorption of circularly polarized light which propagates along the magnetic field direction. Zeeman pumping can be done for atoms which show the Zeeman effect which consists in the splitting up of the spectral lines of a substance when subjected to the influence of a moderately intense magnetic field.

Recently, investigations have been made of phenomena which can be described by adiabatic following. These phenomena are reported, for example, by D. Grischkowsky and J. A. Armstrong, in "Self-Defocusing of Light by Adibatic Following in Rubidium Vapor," *Physical Review A*, Vol. 6, No. 4, October 1972, D. Grischkowsky, "Adiabatic Following and Slow Optical Pulse propagation in Rubidium Vapor," *Physical Review A*, Vol. 7, No. 6, June 1973, and D. Grischkowsky, Eric Courtens and J. A. Armstrong, "Observation of Self-Steepening of Optical Pulses with Possible Shock Formation," *Physical Review Letters*, Vol. 31, No. 7, Aug. 13, 1973. The term adiabatic following describes the situation in which the pseudomoment of the near-resonant transition follows the effective field of a laser pulse. Adiabatic following occurs when two conditions are met. First, in the rotating coordinate frame, the direction of the effective field must change slowly compared to the precession frequency of the pseudomoment about the effective field; and second, the pulse width must be short compared to the relaxation times of the atomic system.

SUMMARY OF THE INVENTION

It is therefore an object of the present invention to provide an extremely fast, low loss, completely passive light modulator which operates on the principle of the control by a circularly polarized driving light beam of the population densities of atoms in the magnetic sublevels corresponding to the $\sigma^-$ or $\sigma^+$ transition of the ground and excited states of an atomic vapor in a light cell.

According to the teachings of the invention, a light cell is provided which contains a gas of one of the alkali metals such as rubidium and potassium. This light cell is referred to as a coherent rotator and, under the control of the driving light beam, is effective to rotate the plane of polarization of a linearly polarized main light beam. By providing a polarizer at the output of the coherent rotator, the resulting structure is that of a highly efficient, simple and very rugged light modulator capable of operating as a shutter which opens in less than 1 psec or as an amplitude modulator at frequencies as high as $3 \times 10^{11}$ Hz. Moreover, the main beam can be as much as a thousand times more powerful than the driving beam. Two modes of operation are possible depending on whether the driving pulse is applied adiabatically or non-adiabatically.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

Figure 1A:
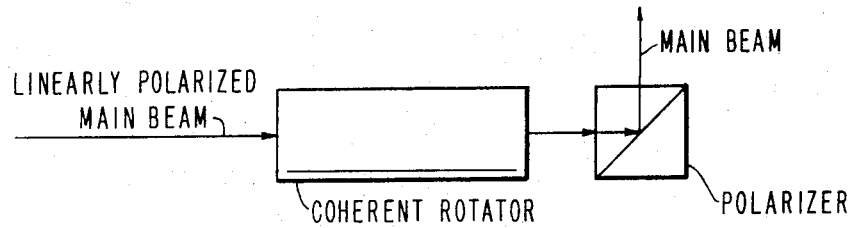
FIGS. 1a and 1b illustrate the light modulator and its operation according to the invention.
Figure 1B:
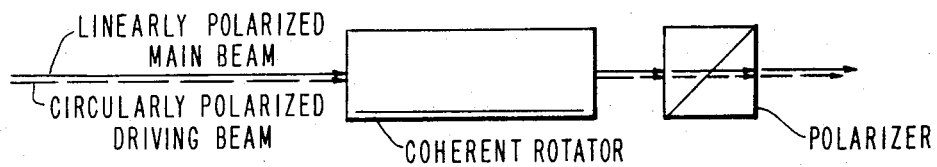

The modulator according to the invention comprises the combination of a coherent rotator and a polarizer. As shown in FIG. 1a, without the driving beam the rotation angle $\phi_c$ of the polarization of the linearly polarized main beam is independent of time. The polarizer is oriented at right angles to the plane of polarization of the main beam, and as a result, the main beam is completely blocked by the polarizer. The presence of the circularly polarized driving beam in the coherent rotator changes $\phi_c$, and some of the main beam passes through the polarizer. When $\phi_c$ is $\pi/2$, the main beam is completely transmitted by the polarizer, as shown in FIG. 1b.

Figure 2:
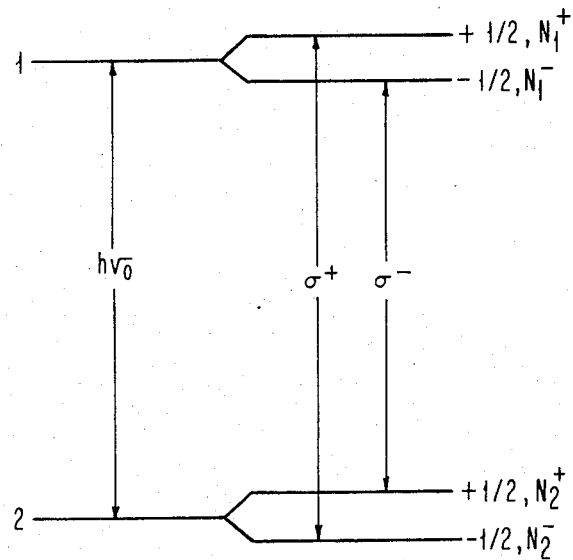
FIGS. 2, 3 and 4 are energy level diagrams of atoms contained in the coherent rotator of the modulator shown in FIGS. 1a and 1b.
Figure 3:
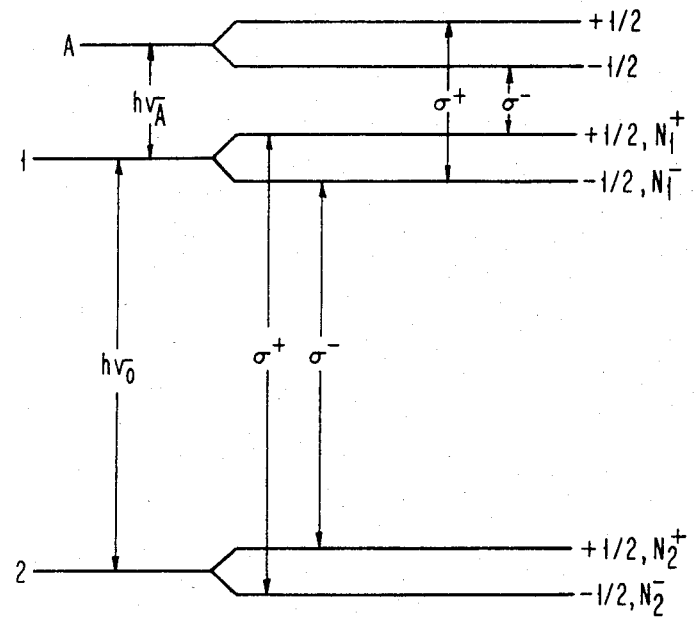
Figure 4:
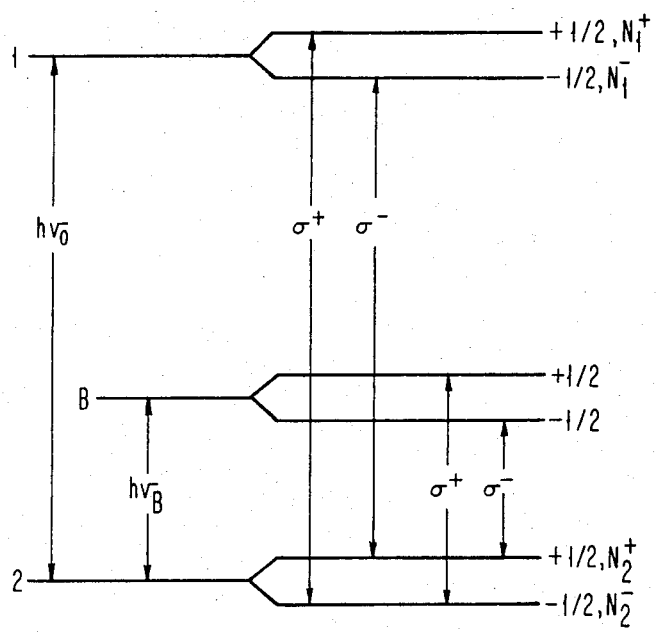

The coherent rotator contains atoms (or ions, molecules, excitons, etc.) described by one of the three energy diagrams shown in FIGS. 2, 3 or 4. For the purposes of this description, each level is assumed to be doubly degenerate or exhibits two magnetic sublevels in each energy state. The working levels 1 and 2 are connected by $\sigma^+$ and $\sigma^-$ circularly polarized electric dipole transitions, where level 2 is the atomic ground state. In addition, the level A in FIG. 3 is any level connected by $\sigma^+$ and $\sigma^-$ transitions to level 1, and the level B in FIG. 4 is any level connected by $\sigma^+$ and $\sigma^-$ transitions to level 2.

Let the number density of atoms in the $+\frac{1}{2}$ or $-\frac{1}{2}$ state of level 2 be designated as $N_2^+$ or $N_2^-$, respectively. Similarly, let the number density of atoms in the $+\frac{1}{2}$ or $-\frac{1}{2}$ state of level 1 be designated as $N_1^+$ or $N_1^-$, respectively. In the absence of the driving beam, all the atoms are in the ground state 2, and $N_2^+ = N_2^- = N/2$, where $N$ is the atomic number density.

The frequency $\nu_d$ of the circularly polarized $\sigma^-$ driving beam is resonant or nearly resonant with the frequency separation $\nu_o$ between the two working levels 1 and 2. The frequency $\nu_m$ of the linearly polarized main beam is relatively far from resonance from any one of the three transition frequencies $\nu_o$, $\nu_A$ or $\nu_B$, corresponding to FIGS. 2, 3, or 4, respectively. In the following example, we assume $\nu_m$ is closest to $\nu_o$ and consider the energy level diagram of FIG. 2.

The rotation angle $\phi_c$ of the polarization of the main beam caused by passage through the coherent rotator is given by $$\phi_c = \pi(n^+ - n^-)l/\lambda_m \qquad (1)$$

where $n^+$ ($n^-$) is the index of refraction for the $\sigma^+$ ($\sigma^-$) component of the main beam; $l$ is the length of the coherent rotator; $\lambda_m$ is the wavelength of the main beam. In the limit that the Zeeman splitting approaches zero, the equation for $\phi_c$ can be written as $$\phi_c = \pi l/\lambda_m \{-(N_2^+ - N_1^+)2\pi P_{12}^2/h(\nu_m - \nu_o) + (N_2^- - N_1^-)2\pi P_{12}^2/h(\nu_m - \nu_o)\} \qquad (2)$$

where $P_{12}$ is the absolute value of the matrix element of the electric dipole moment operator for the $\sigma\pm$ transitions between the working levels 1 and 2. By factoring out common terms, equation (2) becomes $$\phi_c = 2\pi^2 l P_{12}^2/\lambda_m h(\nu_m - \nu_o)\{-(N_2^+ - N_1^+) + (N_2^- - N_1^-)\} \qquad (3)$$

When a $\sigma^-$ driving beam is supplied to the coherent rotator, the effect of the $\sigma^-$ driving beam is to put the atoms into a superposition of the $\sigma^-$ ground and excited states, which in turn changes $(N_2^- - N_1^-)$. In the notation of coherent optics $(N_2^- - N_1^-) = -(N/2)\cos\theta$, where $\theta$ is the angle between the pseudomoment and the direction of propagation (positive $z$ axis) of the driving beam. $(N_2^+ - N_1^+) = N/2$ is unchanged by the driving beam. Thus, with the driving beam present, Eq. 2 becomes $$\phi_c = -\pi^2 l P_{12}^2 N/\lambda_m h(\nu_m - \nu_o)[1 + \cos\theta] \qquad (4)$$

If the driving beam satisfies the conditions of adiabatic following, an explicit expression for $\cos\theta$ can be written $$\cos\theta = -|\nu_o - \nu_d|/\sqrt{(\nu_o - \nu_d)^2 + 2P_{12}^2 E_d^2/h^2} \qquad (5)$$

$E_d$ is the electric field strength of the $\sigma^-$ driving beam.

We first assume $\nu_d < \nu_o$ to eliminate any problems caused by self-focusing. The response time $t_r$ (the switching time) of the modulator when driven adiabatically is approximately $t_r = 1/(\nu_o - \nu_d)$. The effect of the main beam on the working levels 1 and 2 must always be much less than the effect of the driving beam, and this will be so if $$E_m/2/|\nu_m - \nu_o| << E_d/|\nu_d - \nu_o| \qquad (6)$$

where $E_m$ is the peak electric field of the linearly polarized main beam.

As an example, consider rubidium vapor as the coherent rotator material. Let the working levels correspond to the $^2P$ line (7,948Å) of Rb. Let $(\nu_o - \nu_d)/c = 1$ cm$^{-1}$; thus, the switching speed $t_r$ is approximately 30 psec. Assume $\theta = 120°$ at the peak of the controlling pulse. As $P_{12} = 6.16 \times 10^{-18}$ e.s.u. for this transition, $\theta = 120°$ requires a peak intensity for the driving beam of only 400 Kw/cm$^2$. If $|\nu_m - \nu_o|/c = 100$ cm$^{-1}$, then setting $E_m/2 |\nu_m - \nu_o| \approx 0.25$ $E_d/|\nu_d - \nu_o|$, we see that the main beam can be more than one thousand times as intense as the driving beam. If we let the length of the coherent rotator be 100 cm (a reasonable value), we calculate that the atomic number density $N = 1.3 \times 10^{14}$/cm$^3$ is required to have $\phi_c = \pi/2$ at the peak of the controlling pulse. This number density corresponds to a Rb cell temperature of only 155°C, which is easily obtained. For a modulator and a driving beam with these parameters, the driver can completely open and close the modulator in about 30 psec, can keep the modulator open, and can put any slowly varying (compared to 30 psec) amplitude modulation on the powerful main beam.

It is interesting to compare this value of $\phi_c = \pi/2$ with the rotation angle $\phi_F$ obtained from the Faraday effect with the same cell in a magnetic field H. In this case, the rotation angle $\phi_F$ of the polarization of the main beam due to the Faraday effect caused by passage through the rotator is given by $$\phi_F = \pi(n^+ - n^-)l/\lambda_m \qquad (7)$$

which can be expanded as $$\phi_F = -(\pi^2 l P_{12}^2 N/\lambda_m h)\{1/(\nu_m - \nu_o - \delta) - 1/(\nu_m - \nu_o + \delta)\} \qquad (8)$$

where $2\delta$ is the Zeeman splitting between the $\sigma^+$ and $\sigma^-$ lines. Because $\delta << |\nu_m - \nu_o|$, $\phi_F$ is approximately equal to $$\phi_F = -[\pi^2 l P_{12}^2 N/\lambda_m h(\nu_m - \nu_o)]\{2\delta/(\nu_m - \nu_o)\} \qquad (9)$$

Consider $2\delta = 1$ cm$^{-1}$; this corresponds to a magnetic field $H = 8$ kG, which is a relatively large field. Thus, for this example $\phi_c/\phi_F = 50$. This shows that the coherent rotator gives an extremely large rotation compared to other devices.

Now consider the situation where $\nu_d = \nu_o$ and the driving pulse is applied non-adiabatically. Now the pseudomoment precesses in a plane normal to $E_d$, and $\phi$ is given by $$\theta = \pi - (\sqrt{2} P_{12}/\hbar) \int_0^t E_d \, dt \qquad (10)$$

where $\hbar = h/2\pi$. In order to make the discussion concise, we assume $E_d$ was applied suddenly at $t = 0$ and then held constant, then $$\theta = \pi - (\sqrt{2} P_{12}/\hbar) E_d t, \qquad (11)$$

and Eq. 4 for $\phi_c$ becomes $$\phi_o = \frac{-\pi^2 l P_{12}^2 N}{\lambda_m \hbar (\nu_m - \nu_o)} \left\{ 1 - \cos \frac{(\sqrt{2} P_{12} E_d t)}{\hbar} \right\} \qquad (12)$$

Thus, $\phi_c$ is oscillating, and the modulator will transmit a train of pulses with the repetition rate $\sqrt{2} P_{12} E_d/\hbar$. It is important to notice that the repetition rate is proportional to the magnitude of the driving field; the modulator converts amplitude changes of the driving field into changes in the pulse repetition rate.

This time for a numerical example, consider potassium vapor which has a very small hyperfine splitting. Now $\nu_o = \nu_d$; increase the intensity of the driving beam to 4 Mw/cm². This choice gives $\sqrt{2} P_{12} E_d/hc = 5.5$ cm⁻¹. Let $|\nu_m - \nu_o|/c = 10$ cm⁻¹, then for the maximum value of $\phi_c = \pi/2$, $N \approx 0.65 \times 10^{13}/cm^3$ with $l = 100$ cm.

If we had chosen to have a faster switching time, the power required for the driving beam would have been increased. It should be realized that the frequencies $\nu_d$ and $\nu_m$ can be completely different if the modulator uses the energy level scheme of FIG. 3 or FIG. 4. For example, a weak visible light beam could control the passage of a 10 micron $CO_2$ laser beam of enormous power. Furthermore, while a $\sigma^-$ circularly polarized driving beam was assumed for the specific examples given, a $\sigma^+$ circularly polarized driving beam could be used.

It will be apparent that the embodiments disclosed are only exemplary and that various modifications can be made in construction and arrangement within the scope of the invention as defined in the appended claims.

What is claimed is:

1. A light controlled light modulator comprising:
   a. a coherent rotator containing a material exhibiting Zeeman splitting of the optical spectra of radiations emitted by atomic transitions wherein the population densities of atoms in the Zeeman magnetic sublevels of the ground and excited states are controlled by a circularly polarized driving light beam, and
   b. a polarizer oriented to variably transmit a main beam of linearly polarized light as a function of the rotation of the plane of polarization of the main beam by passage through said coherent rotator.

2. A light controlled light modulator as recited in claim 1 wherein the coherent rotator material in said coherent rotator is selected from the class of alkali metals.

3. A light controlled light modulator as recited in claim 2 wherein the coherent rotator material is rubidium.

4. A light controlled light modulator as recited in claim 2 wherein the coherent rotator is potassium.

5. A light controlled light modulator as recited in claim 1 wherein the frequency $\nu_d$ of the driving beam is resonant or nearly resonant with the frequency separation $\nu_o$ between two working levels of the atomic states of the atoms in said coherent rotator material and the frequency $\nu_m$ of the main beam is far from the frequency separation $\nu_o$ between said two working levels.

6. A light controlled light modulator as recited in claim 5 wherein $\nu_d < \nu_o$ and a pulse of the driving beam is applied adiabatically.

7. A light controlled light modulator as recited in claim 6 wherein the coherent rotator material is rubidium vapor.

8. A light controlled light modulator as recited in claim 5 wherein $\nu_d = \nu_o$ and a pulse of the driving beam is applied non-adiabatically.

9. A light controlled light modulator as recited in claim 8 wherein the coherent rotator material is potassium vapor.

* * * * *

UNITED STATES PATENT OFFICE
CERTIFICATE OF CORRECTION

PATENT NO. : 3,864,020
DATED : February 4, 1975
INVENTOR(S) : John A. ARMSTRONG et al It is certified that error appears in the above-identified patent and that said Letters Patent are hereby corrected as shown below:

IN THE SPECIFICATION:

Column 1, line 10 - after "Art" delete "and"

Column 3, line 59 - delete "N/2is" and insert -- N/2 is --

Column 4, line 21 - delete "$^2$P" and insert -- $^2P_{1/2}$ -- line 21 - delete "(7,948A)" and insert -- 7,948Å) --

Column 5, line 30 - delete "hc" and insert -- ℏc --

Signed and sealed this 29th day of April 1975.

(SEAL)
Attest:

RUTH C. MASON
Attesting Officer

C. MARSHALL DANN
Commissioner of Patents
and Trademarks